United States Patent [19]

Hilsum et al.

[11] 3,972,040
[45] July 27, 1976

[54] DISPLAY SYSTEMS

[75] Inventors: Cyril Hilsum, Malvern; Adrian Leonard Mears, Leckhampton, near Cheltenham, both of England

[73] Assignee: The Secretary of State for Defence in Her Britannic Majesty's Government of the United Kingdom of Great Britain and Northern Ireland, London, England

[22] Filed: Aug. 12, 1974

[21] Appl. No.: 496,716

[30] Foreign Application Priority Data
Aug. 15, 1974 United Kingdom............... 38635/73

[52] U.S. Cl.................. 340/324 M; 315/169 TV; 340/166 EL; 340/173 DR
[51] Int. Cl.²......................................... G08B 5/36
[58] Field of Search ............... 340/173 LS, 173 PL, 340/173 DR, 173 CA, 324 M, 166 EL; 315/169 TV

[56] References Cited
UNITED STATES PATENTS

| | | | |
|---|---|---|---|
| 2,847,615 | 8/1958 | Engelbart | 340/173 LS |
| 3,533,089 | 10/1970 | Wahlstrom | 340/173 DR |
| 3,559,190 | 1/1971 | Bitzer et al. | 340/173 PL |
| 3,796,997 | 3/1974 | Johnson et al. | 340/173 PL |
| 3,821,720 | 6/1974 | Greubel et al. | 340/173 LS |
| 3,848,237 | 11/1974 | Geilhufe et al. | 340/173 DR |

*Primary Examiner*—David L. Trafton
*Attorney, Agent, or Firm*—Stevens, Davis, Miller & Mosher

[57] ABSTRACT

A refreshed electro-optic display comprising a plurality of individually addressed display elements which may be arranged in a matrix form is characterised in that the memory for refreshing is derived from the display elements themselves. Each display element is refreshed by sensing by one or a plurality of sensors the state of a physical property of the element to detect whether or not it has been selected to be operated and by feeding a control signal in an individual feedback loop from the sensor to open an electronic gate, to apply an electrical potential to the element, when sensed to be operated, to keep it in the operated state. The physical property sensed may be the electrical capacitance or resistance of the display elements, the state of light emission or modulation from them or the state of charge storage within them. Preferably a voltage is developed which depends on the state of the property. In that case the sensor can comprise a voltage comparator which compares the sensed voltage with a reference voltage. The display elements may for example be liquid crystal, electroluminescent electrochromic, electrophoretic, or minature plasma elements.

9 Claims, 3 Drawing Figures

DISPLAY SYSTEMS

The present invention relates generally to display systems and particularly to the refreshing of displays.

For many years the conversion of information from an electrical form into an optical form has been carried out using displays based upon vacuum tube devices such as the cathode ray tube. Such displays have proved to be very convenient and reliable in many applications for example in displaying radar returns or in displaying television pictures. However some modern applications require displays having an adaptable shape and size which can be operated using relatively low voltages and relatively low power and which can be manufactured relatively cheaply: as a result of these requirements much interest in the display field has been diverted from conventional displays based upon vacuum tube devices towards other kinds of display such as those based upon solid state devices, for example electroluminescent devices, and upon liquid crystal devices.

These other kinds of display have produced problems not previously encountered with conventional displays. One such problem is concerned with sustaining operation of those parts of the display selected to display information. Typically, a non-vacuum tube display is made up from a matrix array of display elements each of which can be individually addressed, fed with electrical information to convert to an optical form. Addressing is normally carried out by scanning selected elements of the display with an electrical operating signal.

Normally, it is necessary for selected elements to display information for a period longer than the decay time of the display effect they use, the time for which those elements continue to display an element of information or of a displayed scene after the electrical operating signal has been removed from them. One known way of overcoming this problem is to provide refreshing of the selected elements by applying the operating signal to them repeatedly. Refreshing is to be distinguished from resetting or rewriting which involves changing the information or scene displayed.

It is possible to refresh a display by using a separate computer as the memory. However, most prior art refreshed displays have used a local memory store forming part of the drive electronics for the display. Such stores can be relatively expensive because a separate element of storage can be required for each display element.

It is an object of the invention to reduce the cost of the memory for a refreshed display.

With this object in mind it has now been discovered that a display can act as its own memory for the purposes of refreshed operation.

According to the present invention a display system includes a display comprising a plurality of display elements, each capable of producing an optical display signal in response to electrical operating energy and means for operating the display in a refreshed manner, characterised in that the means for operating includes a plurality of electrical gates each electrically connected to an individual one of the display elements and capable when open of gating an electrical operating signal to that element, a plurality of sensors each connected to an individual one of the display elements and capable of detecting the state of a physical property of that element in order to determine whether that element is or is not selected to be in an operated state and a plurality of feedback loops each separately connected between an individual one of the display elements and the gate connected to that display element and being responsive to the output of the sensor connected to that display element.

The invention allows the display to be refreshed by a memory which can be made in a relatively inexpensive form.

By an 'operated state' is meant a state in which the said element is displaying an element of information or of a given scene.

The plurality of display elements is conveniently arranged in a straight line. In that case the straight line can be one row in a row and column matrix array of similar display elements; each feedback loop, sensor and gate can then be common to all of the display elements in a given column.

The display elements can be active, i.e. of the kind generating light; for example they can be electroluminescent phosphor elements or light-emitting diodes. Alternatively, they can be substractive, i.e. of the kind modulating light; for example they can be liquid crystal elements. The display elements need not be entirely discrete elements. They can contain a medium which is distributed between them. For example in a liquid crystal display a layer of a liquid crystal material is normally distributed between all the elements; the elements are defined by the conductors used to address them.

The physical property of each display element which is detected can be its electrical capacitance, its electrical resistance, the state of charge storage within it or the state of light emission or modulation produced by it.

Each sensor can incorporate a electrical potential comparator located in part of its corresponding feedback loop. If the detected property is the electrical capacitance each sensor can also incorporate a separate electrical capacitor connected to each separate display element or column of display elements and an electrical connection from the appropriate comparator to the electrical mid-point between the appropriate element and electrical capacitor. If the detected property is the state of light emission or modulation each sensor can also incorporate a separate photosensitive element, such as as photoconductor or photovoltaic element, located adjacent to each separate display element or column of display elements, an electrical resistor connected to the photosensitive element, and an electrical connection from the appropriate comparator to the mid-point between the appropriate electrical resistor and the appropriate photosensitive element.

Embodiments of the present invention will be described by way of example with reference to the accompanying drawings, in which.

Figure 1:
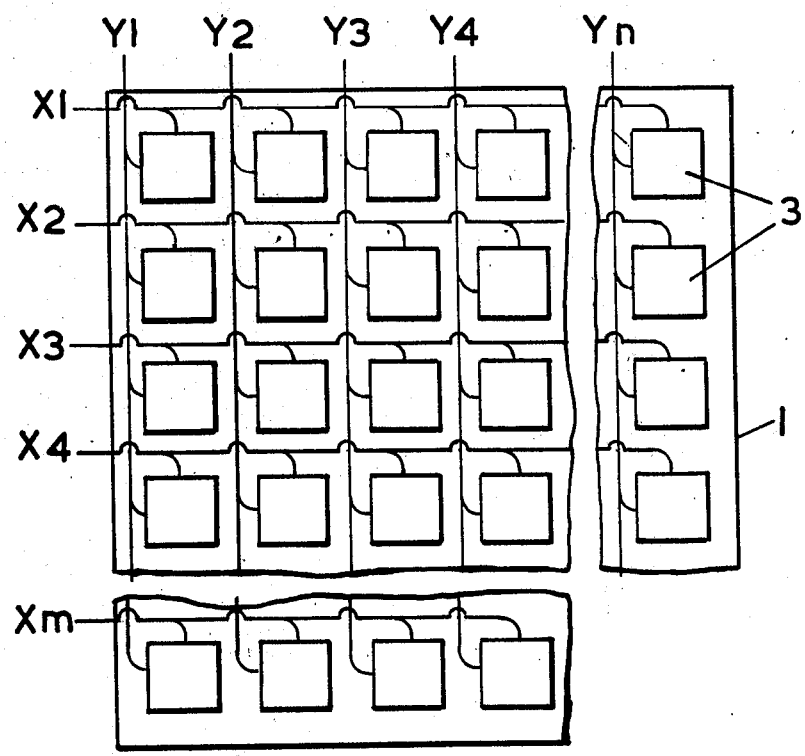
FIG. 1 is a schematic representation of a known display panel.

FIG. 1 is a schematic representation of a known display panel to which the invention can be applied as described below. The panel, denoted by the reference number 1, contains a matrix of rows and columns of display elements 3. The elements 3 are illustrated as discrete elements; however they can alternatively be elements incorporating a medium distributed between them. Conductors X1, X2, X3, X4 ... Xm, collectively referred to herein as X conductors, are respectively connected to all of the elements 3 in the first, second, third, fourth ... mth rows of the matrix. Conductors Y1, Y2, Y3 Y4 ... Yn, collectively referred to herein as Y conductors, are respectively connected to all of the elements 3 in the first, second, third, fourth ... nth columns of the matrix. The elements 3 can for instance be electroluminescent phosphor elements, such as elements which are responsive to unidirectional operating voltages, for instance those made from zinc sulphide doped with manganese and copper. The elements 3 can also be, for instance, (so called) light-emitting diodes, i.e. semiconductor p-n junctions which emit light when forward biased, minature plasma discharge elements, electrochromic elements, electrophoretic elements or liquid crystal elements. If they are electrochromic, electrophoretic or liquid crystal elements they are used to modulate light generated from a separate source (not shown), which can be a natural source such as the sun.

When appropriate voltages are applied between selected X conductors and Y conductors the elements 3 at the intersections of those conductors are operated, i.e. are caused to emit light or modulate light as appropriate, to give a display. Information such as alphanumeric characters or visual scene can conveniently be displayed by operating selected groups of the elements 3 together.

One known way of applying the operating voltages is to apply an electrical potential pulse of one polarity to the conductor X1 whilst applying an electrical potential pulse of the opposite polarity to selected Y conductors, either together or in turn, then to apply an electrical potential pulse of the first polarity to the conductor X2 whilst applying an electrical potential pulse of the opposite polarity to further selected Y conductors and so on.

The two kinds of pulses have magnitudes such that they are not individually capable of causing significant operation of the elements 3 but are so capable when combined together.

Another known way of applying the operating voltages which is particularly suitable when the elements 3 are liquid crystal elements, particularly those using the cholesteric to nematic phase-change effect, is the so-called "third-select" technique. In the d.c. form of this technique positive and negative potential pulses having a magnitude of 3 V/2 are applied to selected Y conductors and selected X conductors respectively, whilst negative and positive potentials having a magnitude of V/2 are applied contemporaneously to unselected Y conductors and X conductors respectively, 2V being a voltage near but above the display effect voltage threshold. In the a.c. form of the technique the relative polarities and the magnitudes are the same as in the d.c. form but the absolute polarities are constantly reversed.

Figure 2:
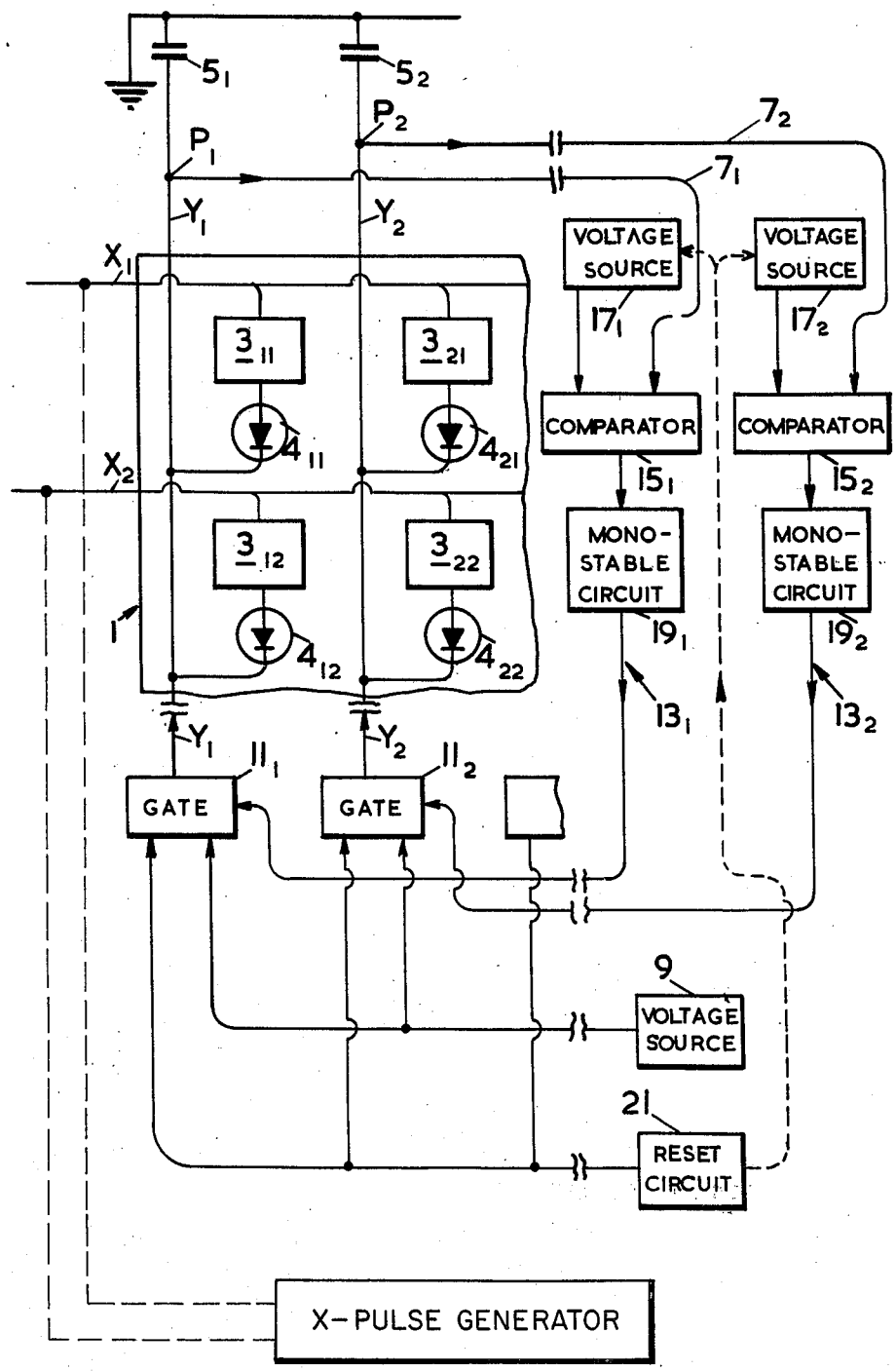
FIG. 2 is a schematic representation of part of a display system embodying the present invention.
Figure 3:
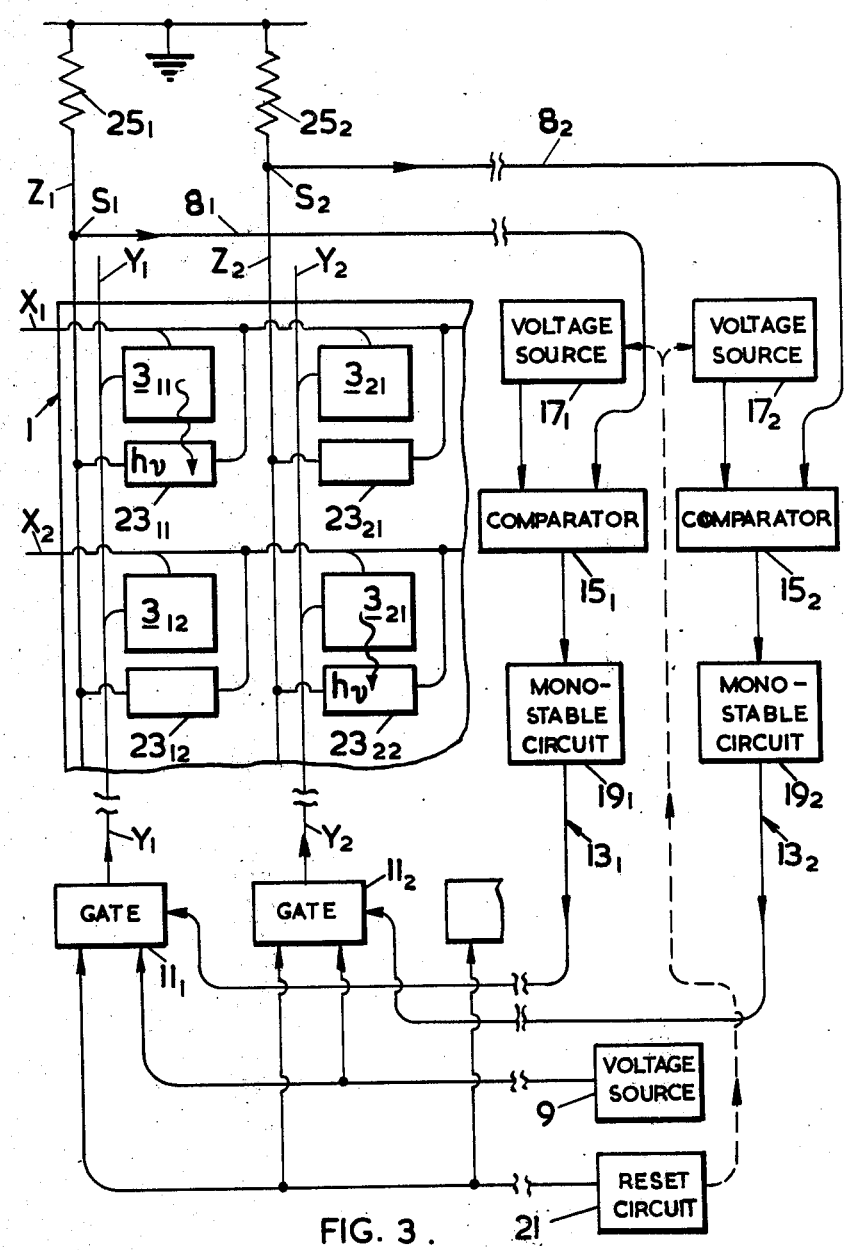
FIG. 3 shows an alternative embodiment of the present invention.

FIGS. 2 and 3 are schematic diagrams of parts of alternative refreshed display systems embodying the invention. Both systems incorporate the display panel 1 illustrated in FIG. 1; its elements 3 are operated in one of the ways described above. That is, an appropriate electrical pulse, hereinafter called an X operating pulse, is applied to each X conductor in turn and an appropriate contemporaneous electrical pulse, hereinafter called a Y operating pulse, is applied to each appropriate Y conductor, either together or in turn; the coincidence of the X and Y operating pulses at an element 3 causes operation of that element. Both systems additionally incorporate an arrangement for (a) periodically sensing which of the elements 3 in each row in turn have been selected to be operated by sensing which of the elements 3 are in the operated state and for (b) subsequently applying to those selected elements 3 a further Y operating pulse which, together with a further X operating pulse applied contemporaneously to the X conductor connected to those elements 3, keeps those selected elements 3 in the operated state.

In the refreshed display system illustrated in part in FIG. 2 each element 3 has a separate rectifying diode 4 in series with it. The first and second subscripts of the reference symbol of each element 3 and each diode 4 represents respectively the Y conductor and the X conductor to which those members are connected. Each Y conductor has at one end an electrical capacitor 5, the capacitor 5 at the end of the conductor Y1 being denoted with a reference subscript 1 and that at the end of the conductor Y2 being denoted with a reference subscript 2, and so on. The terminal of each capacitor 5 remote from the elements 3 is earthed. The capacitors 5 are all identical. Each Y conductor has at its other end an electronic gate 11, denoted in FIG. 2 by a subscript referring to the corresponding Y conductor. A voltage source 9 which may be a single common voltage source is arranged to supply the Y operating pulse to any Y conductor whenever the gate 11 belonging to that Y conductor is opened. The X operating pulses are applied at appropriate times to one end of each X conductor in turn. The electrical potential of the other end of each X conductor is floating.

Each gate 11 is opened, when necessary and for an appropriate time interval, by an individual feedback loop 13 connected between the Y conductor connected to that gate 11 and one terminal of that gate 11. Each feedback loop 13 includes an individual conductor 7 connected to an individual point P on the corresponding Y conductor between the corresponding capacitor 5 and gate 11, an individual voltage source 17, an individual electrical potential comparator 15 for comparing the potential at the point P to which it is connected with a reference potential developed by the corresponding voltage source 17 and an individual monostable circuit 19. The feedback loops 13 the conductors 7 and their points P, the voltage sources 17, the comparators 15 and the monostable circuits 19 are denoted in FIG. 2 by a subscript referring to the corresponding Y conductor.

Each feedback loop 13 causes the gate 11 to which it is connected to be opened, when required, in the following way. Suppose that the system is already working and an X operating pulse is applied to the conductor X1 and that a Y operating pulse is applied coincidently to the conductor Y1 but not the conductor Y2. The element $3_{11}$ is in the operated state for a period determined by the length of the pulses plus the decay rate of the particular display effect used after removal of the pulses; the electrical capaciatnce of the element 3 is relatively high during this period. The element $3_{21}$ remains in the non-operated state throughout this period. The element $3_{21}$ remains in the non-operated state throughout this period, its eletrical capacitance is relatively low during this period.

If a short interrogation pulse of positive electrical potential is applied from a conventional pulse generator to the conductor X1 after the X operating pulse but during the operating period of the display element $3_{11}$, i.e. the period when its display is occurring and before the effect decays, the interrogation pulse will cause the electrical potential of each point P to rise to a positive potential on the application of the interrogation pulse. The potential to which each point P arises is dependent on the ratio of the capacitance of the capacitor 5 to the capacitance of the corresponding element 3 in the row of the conductor X1, to which element 3 that point P is connected; the potential is relatively high when the capacitance of the corresponding element 3 is relatively high and is relatively low when the capacitance of that element 3 is relatively low. Therefore the potential at the point $P_1$ on the conductor Y1 resulting from the interrogation pulse is a relatively high value whereas that at the point $P_2$ on the conductor Y2 is a relatively low value.

The reference potential developed by each voltage source 17 is set at a level to distinguish these two values. In other words, the maximum potential of the point $P_1$ on the conductor Y1 resulting from the interrogation pulse is higher than the reference potential, whereas that of the point $P_2$ on the conductor Y2 is lower than the reference potential. As a result, the comparator $15_1$ connected to the conductor Y1 is caused to provide an output signal, whereas the comparator $15_2$ connected to the conductor Y2 is not. The output signal triggers the monostable circuit $19_1$ causing it to emit a fixed length output pulse. The monostable circuit $19_2$ is not triggered. The gate $11_1$ is opened by the emitted pulse, allowing a Y operating pulse to be applied to the conductor Y1 from the voltage source 9. An X operating pulse is arranged to be applied to the conductor X1 coincidently with that Y operating pulse, keeping the element $3_{11}$ in the operated state. The gate $11_2$ is not opened and no Y operating pulse is applied to the conductor Y2.

Every element 3 of the panel 1 is maintained in a given state, viz operated or non-operated, in this way. The X operating pulse and the interrogation pulse are preferably applied as a pair repeatedly to each X conductor in turn; either can lead and one can be the leading edge of the other.

If the display effect of each element 3 lasts longer than the time required to apply the X operating pulse to all of the X conductors, i.e. the "frame time", then the interrogation pulse preferably leads the X operating pulse. However if the display effect does not last for that time then the interrogation pulse preferably follows the X operating pulse. In either case, the length of time for each comparator 15, monostable circuit 19 and gate 11 to respond in turn to the interrogation pulse is matched to the length of time between the response of an element 3 to the interrogation pulse and the response of that element 3 to the next X operating pulse applied to it. In the latter case mentioned above this involves a delay in the opening of each gate 11 following the interrogation pulse.

Preferably, the input impedance of the gates 11 to the Y conductors are extremely high when the gates 11 are closed.

When it is required to change the state of any given element 3 an appropriate signal is applied from a reset circuit 21 to the gate 11 connected to that element 3 during the application of an X operating pulse to that element 3 causing the condition of that gate 11 to be changed, i.e. from closed to open or from open to closed as appropriate, from its condition during the application of the previous X operating pulse.

Alternatively, the signal can be applied from the reset circuit 21 to each appropriate voltage source 17 causing the reference potential developed by that voltage source 17 to be changed for a short interval by an amount sufficient to allow the corresponding comparator 15 connected to it to change state during the application of an interrogation pulse to any given X conductor.

The refreshed display system described with reference to FIG. 2 is particularly suitable in the case when the elements 3 are elements in a liquid crystal display.

The diodes 4 are provided to isolate the elements 3 from one another. This is necessary so that when the interrogation pulse is applied for example to the conductor X1, the respective electrical potentials at the points P are not significantly affected by the impedances in paths through the panel and its associated conductors, which paths are electrically in parallel with the elements $3_{11}, 3_{21} \ldots 3_{n1}$ and/or the capacitors 5 (and so on). Each diode 4 is arranged so that it is forward biased by the interrogation pulse for this purpose.

For a liquid crystal matrix having an operating threshold of about 10 volts it had been found suitable to use capacitors (corresponding to the capacitors 5) having a capacitance value of 470 pF, to use a reference voltage of about 2.5 volts for the comparators (corresponding to the comparators 15), to use monostable circuits (corresponding to the monostable circuits 19) providing an output pulse having a duration of 40 $\mu$sec and to use an interrogation pulse having a magnitude of about 8 volts and a duration of a few microseconds.

The refreshed display system illustrated in part in FIG. 3 is an alternative to that illustrated in part in FIG. 2. Besides the panel 1, the system illustrated in part in FIG. 3 also contains comparators 15, voltage sources 17, monostable circuits 19, gates 11 and a voltage source 9 all identical with and arranged in the same way as the corresponding ones in the system of FIG. 2. The system illustrated in part in FIG. 3 also contains a plurality of conductors 8 each connected to a separate one of the comparators 15. However unlike each of the conductors 7 in the system of FIG. 2, each of the conductors 8 is connected to an individual point S on the appropriate one of a series of Z conductors Z1, Z2 . . . . running parallel to the Y conductors, the conductors Y1 and Z1 forming a pair, the conductors Y2 and Z2 forming a pair, and so on. A separate photosensitive element 23, which may be a cadmium cadmium or cadimium selenide photo-voltaic element, is located adjacent to each separate element 3 so that when the element 3 is in the operated state, as illustrated in the case of two of the elements 3 in FIG. 3 by a wavy line and the symbol h$\nu$, a conducting channel is formed through that photosensitive element 23. Each photosensitive element 23 is connected between the same X conductor to which its adjacent element 3 is connected and an individual one of the Z conductors. The capacitors 5 used in the system illustrated in part in FIG. 2 are not required in the system illustrated in part in FIG. 3. Instead an individual resistor 25 is connected to one end of each Z conductor. The resistors 25 are all identical. The electrical potential of the ends of the Y conductors remote from the gates 11 is floating. The electrical potential of the ends of the resistors 25 remote from the Z conductors is earth potential. The electrical potential of the Z conductors at their other end is floating.

In FIG. 3 a first subscript is used to denote the corresponding Y conductor and a second subscript is used (where appropriate) to denote the corresponding X conductor of given members.

Each gate 11 in the system illustrated in part in FIG. 3 is opened, when necessary, by a pulse from its monostable circuit 19 in the same way as described with reference to FIG. 2, to produce a Y operating pulse which is arranged to be coincident with an X operating pulse applied to the appropriate X conductor.

Each monostable circuit 19 is only triggered when it receives an output signal from its corresponding comparator 15. Each comparator 15 only produces an output signal when the potential of its corresponding conductor 8 rises above the reference supplied by its corresponding voltage source 17. The potentials of the conductors 8 are determined as follows.

Suppose that an X operating pulse is applied to the conductor X1 (FIG. 3) and that a Y operating pulse is applied coincidently to the conductor Y1 but not the conductor Y2. The element $3_{11}$ connected between the conductors X1 and Y1 will then be in the operated state for a period determined by the length of the pulses plus the decay time of the particular display effect used after removal of the pulses; the intensity of the light emitted from the element $3_{11}$ is relatively high during this period; the adjacent photosensitive element $23_{11}$ will be caused to conduct during this period. The element $3_{21}$ connected between the conductors X1 and Y2 remains in the non-operated state; the intensity of the light emitted from the element $3_{21}$ is relatively low during this period; the adjacent photosensitive element $23_{21}$ remains in a resistive state during this period.

If a short interrogation pulse of positive electrical potential is applied to the conductor X1 after the X operating pulse but during the operating period of the display element $3_{11}$, i.e. the period when its display effect is occurring but before that effect decays, the interrogation pulse will cause the electrical potential of the point $S_1$ on the conductor Z1 to rise to a relatively high value because a conducting channel is formed from the conductor X1 to the conductor Z1 through the photosensitive element $23_{11}$ connected between them which is in a conducting state. The point $S_2$ on the conductor Z2 remains at a relatively low value because the photosensitive element $23_{21}$ connected between the conductors Z2 and X1 is in a resistive state.

The reference potential developed by each voltage source 17 is set to distinguish between these two elelctrical potential values. Therefore the comparator $15_1$ produces an output signal, but that in the feedback loop $13_2$ does not.

Every element in the panel 1 in the system illustrated in part in FIG. 3 is maintained in a given state in this way. The Z operating pulse and the interrogation pulse are preferably applied as a pair repeatedly to each X conductor in turn.

The photosensitive elements 23 are photo-voltaic elements and not simple ohmic conductors when in their conducting state (for the purpose of isolation mentioned above concerning the diodes 4 in the system of FIG. 2). Each photosensitive element 23 is arranged so that it is forward biased by the interrogation pulse.

The state of an element 3 can be changed by a reset circuit 21 identical with the reset circuit of FIG. 2 in one of the ways described above with reference to FIG. 2.

The system described with reference to FIG. 3 is particularly useful when the elements 3 are electroluminescent phosphor elements.

The comparators 15 and the voltage sources 17 in the systems of FIG. 2 and FIG. 3 can be dispensed with if the monostable circuit 19 can be arranged to produce a suitable internal reference voltage.

Each of the gates can be a switching circuit, an optoelectronic switch, or a field- effect transistor such as a thin film transistor fabricated in a known way on the same substrate as the panel 1.

Other similar systems can be made to refresh the panel 1. For instance the state of electrical charge stored within the element 3 or the electrical resistance of the elements 3 can depend upon whether the elements 3 are in the on state or the state and can thus be used separately to sense the state of the elements 3.

We claim:

1. A refreshed display system incorporating electro-optic display elements capable of electrically latching the elements into a fixed state, said system comprising a matrix of said elements arranged in rows and columns, a grid of row electrodes each associated with a corresponding one of said rows and each connected to the elements in its corresponding row, a grid of column electrodes each associated with a corresponding one of said columns and each connected to the elements in its corresponding column, said elements being at intersections between said row and column electrodes, means for generating a pulsed operating signal having a refreshing cycle and capable of causing the elements at selected intersections to provide an otpical display signal pulse once per refreshing cycle, a memory and control arrangement capable of providing refreshed operation of said selected elements, said arrangement comprising a plurality of electrical gates associated with one of said electrode grids, each gate being connected to an individual electrode in said grid and capable when open of gating at least a part of said electrical operating signal to said individual electrode and its corresponding elements, a plurality of sensing means each associated with an individual one of the electrodes of said one grid and each capable of detecting in response to an interrogation signal the state of a physical property of the elements connected to its associated individual electrode in order to indicate whether those elements are selected to be operated, a plurality of feedback loops each separately connected between an individual one of said sensing means and an individual one of said gates and means for applying to each of the electrodes of the other of said electrode grids an interrogation signal once per refreshing cycle to cause each of said sensors to open its associated gate whenever it detects said physical property to indicate selection of an element.

2. A system as claimed in claim 1 wherein each of said sensing means comprises a voltage source for developing a reference electrical potential and an electrical potential comparator for comparing said reference potential with a potential indicative of the state of said physical property of an interrogated display element connected to the sensing means and wherein each feedback loop of said system comprises, responsive to the output of said comparator, an individual electrical pulse generator for selectively applying to its associated gate an electrical pulse to open the gate.

3. A system as claimed in claim 1, wherein said one grid is said column electrode grid, said other grid is said row electrode grid, said means for generating a pulsed operating signal is such as to generate once per refreshing cycle a series of X pulses for application each in turn to said row electrodes and a series of Y pulses each for application to said gates and each simultaneous with said X pulses, said elements being selected if said X and Y pulses coincide at their electrode intersection, wherein said means for applying an interrogation signal is arranged to apply said interrogation signal to said row electrodes in turn once per refreshing cycle, the opening of any given gate by its sensor causing application of said Y pulse to a selected element at the intersection of the interrogated row electrode and the column electrode connected to said gate.

4. A system as claimed in claim 3 which incorporates a plurality of electrical capacitors each connected to an individual one of said column electrodes, whereby said potential compared in each of said comparators with said reference potential is a potential indicative of the electrical capacitance of the interrogated elements connected to said column.

5. A system as claimed in claim 4 wherein said elements are liquid crystal display elements.

6. A system as claimed in claim 4 wherein each of said electrode intersections incorporates a non-linear element having a low forward impedance and a high reverse impedance and arranged to be forward biased by said interrogation signal.

7. A system as claimed in claim 4 wherein said system comprises a grid of further column electrodes each associated with an individual one of the first mentioned column electrodes, a plurality of electrical resistors each connected to an individual one of said further column electrodes, a row and column matrix of photosensitive elements associated with said display matrix, each photosensitive element being arranged to be irradiated by an individual one of said display elements when operated, each row of said photosensitive elements being connected to an individual row electrode and each column of said photosensitive elements and each comparator being connected to an individual one of said further column electrodes whereby said interrogation signal interrogates the photosensitive elements on behalf of the display elements and said potential compared in each of said comparators with said reference potential is a potential indicative of the resistance of the interrogated photosensitive element connected to the further column electrode to which that comparator is connected.

8. A system as claimed in claim 7 wherein said photosensitive elements are non-linear photovoltiac elements arranged to be forward-biased by said interrogation signal.

9. A system as claimed in claim 7 wherein said display elements are electroluminescent phosphor elements.

* * * * *